J. RIDER.
Revolver.
No. 21,215.
Patented Aug. 17, 1858.
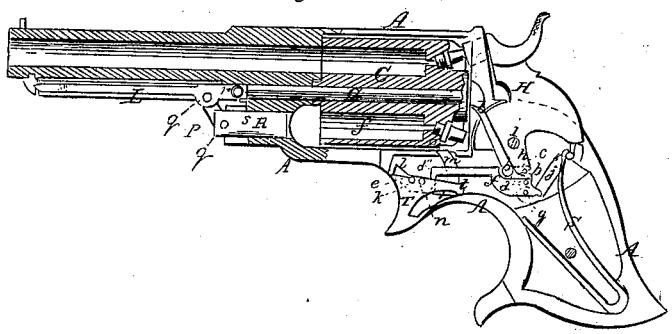
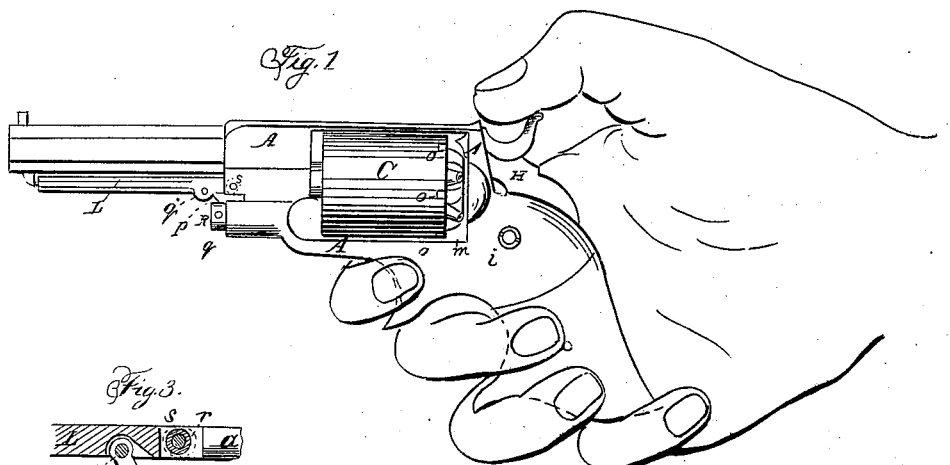
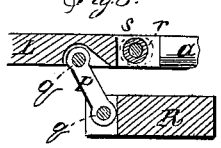

UNITED STATES PATENT OFFICE.

J. RIDER, OF NEWARK, OHIO.

IMPROVEMENT IN REVOLVING FIRE-ARMS.

Specification forming part of Letters Patent No. 21,215, dated August 17, 1858.

*To all whom it may concern:*

Be it known that I, JOSEPH RIDER, of Newark, in the county of Licking and State of Ohio, have invented certain new and useful Improvements in that class of Fire-Arms known as "Revolvers;" and I do hereby declare that the following is a full, clear, and exact description of the same, reference being had to the accompanying drawings, forming part of this specification, in which—

Figure 1 is a side view of a pistol with my improvements. Fig. 2 is a longitudinal section of the same. Fig. 3 is a section of the joint between the lever of the rammer and the center-spindle of the cylinder, on a larger scale than Figs. 1 and 2.

Similar letters of reference indicate corresponding parts in the several figures.

This invention consists in a certain mode of combining the several parts of the lock, whereby a single spring is made to serve in a very effective manner the purposes of mainspring and trigger-spring, and for keeping in its operative position the dog through which the rotation of the cylinder is effected by the cocking of the hammer, and also for operating the stop which locks the cylinder while the hammer is cocked.

To enable others skilled in the art to make and use my invention, I will proceed to describe its construction and operation.

A is the frame, which contains the rotating chambered cylinder C, and receives within it the lock. H is the hammer, working on a pin, $i$, in the usual manner. The cylinder is fitted to rotate on the stationary center-spindle $a$, and formed with notches in its rear end to receive the point of the dog $b$, through which it is rotated by the act of cocking the hammer. The heel of the dog $b$ is connected by a pin, $c$, with the tumbler $h$ of the hammer, and by a pin, $d$, with a hooked piece of steel, $f$, which I call the "reacher," whose duty is to engage with a notch, $e$, in the front part of the top of the trigger T, for the purpose of locking the hammer when cocked. The reacher $f$ is also connected by a pin, $g$, below pin $d$, and a link, $j$, with the only spring S, which resembles the mainspring generally employed in revolvers. The action of the spring S is to keep the hook $f'$ at the front end of the reacher $f$ in contact with the trigger, and by the support thus given to it the reacher is made to constitute a sufficiently rigid connection between the spring and the dog $b$ to keep the latter always in contact with the cylinder, and the dog, by its bearing upon the cylinder, is made to combine with the reacher to form a sufficiently rigid connection between the spring and the tumbler of the hammer to cause the latter to strike and explode the caps or other priming when let off. The dog $b$ acts upon the notches in the rear of the cylinder to rotate it in substantially the same manner as when attached directly to the tumbler in the usual way.

$l\,m$ is the stop for locking the cylinder when the hammer is cocked, the said stop consisting of a bent lever fitted to a slot in the trigger, and attached thereto by a pin, $n$, a short distance in rear of the pin $k$, on which the trigger works. The lever $l\,m$ has a straight upper edge for the greater portion of its length, capable of ranging with the upper edge of the trigger when both are held down in contact with the frame A, as shown in Fig. 2, by the downward pressure of the reacher upon them, when the hammer is not cocked; but in front of the said straight edge of the said lever there is a gradual rise, commencing opposite the notch $e$ of the trigger, and in rear of it is the horn $m$, which enters one of the series of notches $o\,o$ in the cylinder to lock it with a chamber in line with the barrel when the hammer is cocked.

The operation of the several parts of the lock by the act of cocking the hammer is as follows: As the head of the hammer is drawn back the hook $f'$ of the reacher moves forward along the top of the trigger and the straight part of the stop $l\,m$, and holds the stop out of gear with the cylinder while the latter is rotated by the dog $b$; but just as the necessary movement of the cylinder is completed the said hook $f'$ passes over the edge of the notch $n$, which is immediately in front of the trigger-pin $k$, and is forced by the action of the spring S into said notch and caused to depress suddenly the front end of the stop-lever, and thus throw up the horn $m$ of the latter into a notch, $o$, which has arrived just opposite to it. The reacher, after it has fallen into the notch $e$, pulls backward on the trigger and makes spring S perform the function of the ordinary trigger-spring. It is not possible for the cocking to take place till the notch *o* has arrived in proper position with the chamber in line with the barrel, for until the horn *m* of the stop enters the notch the hook *f* of the reacher cannot fall into the notch *e* of the trigger, which is an important feature of the invention, as it prevents the bursting of the chambers, which in some other revolvers is liable to occur from their discharge when out of line with the barrel. By the pressure of the finger on the trigger to fire the stop is confined in the notch *o*, for the pressure tends to force the said horn upward, and as the notch *e* of the trigger is drawn down by the movement produced by the finger, the hook *f'* is prevented moving down with it by reason of said hook resting on the front portion of the locking-lever, which thus causes the release of the reacher from the trigger and the liberation of the hammer.

R is the rammer, consisting of a plunger fitted to work through a guide in the frame A, and connected by a link, *p*, and two pins, *q q'*, with a lever, L, which is connected by a tubular pin, *r*, (see Fig. 3,) to the head of the center spindle, *a*. The lever L is attached to the frame A by a pin, *s*, passing right through the hollow pin *r*, and this pin *s* forms the fulcrum upon which said lever L works to operate the rammer; but when the pin *s* is removed to liberate the center-spindle the said spindle still remains connected with the lever, and by pulling down said lever and forcing the rammer against the front of the cylinder the pin *q'* is converted into a fulcrum, upon which the lever operates to start and commence drawing out the spindle.

What I claim as my invention, and desire to secure by Letters Patent, is—

1. Combining the spring S with the hammer, the rotating dog *b*, and the peculiarly-constructed notched trigger by means of the reacher *f*, constructed, applied, and operating, substantially as herein described, to make the single spring serve the purposes of mainspring, dog-spring, and trigger-spring.

2. The combination of the stop-lever *l m* with the notched trigger and the reacher, by which the said stop is brought by the single spring S into operation on the cylinder as the cocking takes place.

JOSEPH RIDER.

Witnesses:
O. P. WEAKLY,
G. STEINMAN.